US006811804B2

(12) United States Patent
Patel et al.

(10) Patent No.: US 6,811,804 B2
(45) Date of Patent: Nov. 2, 2004

(54) JUICE AND SOY PROTEIN BEVERAGE AND USES THEREOF

(75) Inventors: Gaurav C. Patel, Gahanna, OH (US); Kent L. Cipollo, Westerville, OH (US); Deborah C. Strozier, Westerville, OH (US)

(73) Assignee: Abbott Laboratories, Abbott Park, IL (US)

( * ) Notice: Subject to any disclaimer, the term of this patent is extended or adjusted under 35 U.S.C. 154(b) by 243 days.

(21) Appl. No.: 10/156,533

(22) Filed: May 28, 2002

(65) Prior Publication Data

US 2003/0104108 A1 Jun. 5, 2003

Related U.S. Application Data

(60) Provisional application No. 60/296,614, filed on Jun. 7, 2001.

(51) Int. Cl.[7] .............................................. A23L 2/004
(52) U.S. Cl. ........................................ 426/598; 426/599
(58) Field of Search .................................. 426/598, 599

(56) References Cited

U.S. PATENT DOCUMENTS

| | | | | |
|---|---|---|---|---|
| 3,692,532 A | | 9/1972 | Shenkenberg, et al. | |
| 3,949,098 A | * | 4/1976 | Bangert | 426/324 |
| 4,078,092 A | | 3/1978 | Nishiyama | |
| 4,293,580 A | * | 10/1981 | Rubenstein | 426/565 |
| 4,479,975 A | | 10/1984 | Szczesniak et al. | |
| 4,486,413 A | | 12/1984 | Wiesenberger et al. | |
| 4,722,847 A | | 2/1988 | Heckert | |
| 4,871,554 A | | 10/1989 | Kalala et al. | |
| 4,992,282 A | | 2/1991 | Mehansho et al. | |
| 5,352,384 A | | 10/1994 | Shen | |
| 5,409,725 A | * | 4/1995 | Connolly | 426/599 |
| 5,424,331 A | | 6/1995 | Shlyankevich | |
| 5,492,715 A | * | 2/1996 | Greenland et al. | 426/658 |
| 5,569,459 A | | 10/1996 | Shlyankevich | |
| 5,607,714 A | * | 3/1997 | Connolly | 426/599 |
| 5,637,561 A | | 6/1997 | Shen et al. | |
| 5,637,562 A | | 6/1997 | Shen et al. | |
| 5,641,531 A | | 6/1997 | Liebrecht et al. | |
| 5,654,011 A | | 8/1997 | Jackson et al. | |
| 6,020,016 A | * | 2/2000 | Castleberry | 426/590 |
| 6,150,399 A | * | 11/2000 | Patel et al. | 514/456 |
| 6,372,782 B1 | * | 4/2002 | Patel et al. | 514/456 |
| 6,451,359 B1 | * | 9/2002 | Nsofor | 426/46 |

FOREIGN PATENT DOCUMENTS

| | | |
|---|---|---|
| EP | 0 486 425 B1 | 8/1994 |
| EP | 0 647 408 B1 | 12/1999 |
| GB | 1440161 | 6/1976 |

OTHER PUBLICATIONS

Graham, Horace, 1977. Food Colloids, The Al Publishing Company, Inc., Westport, CT, p. 166–169.*
Rombauer, I. S. 1997. Joy of Cooking, A Plume Book, New York, p. 2,8,9,12.*
Watt, B. K. & Merrill, A. L. 1975. Composition of Foods, Agriculture Handbook No. 8. USDA US Govt. Washington D.C., p. 6 40, 41, 58, 59.*
GeniSoy Soy Protein Products: The Magic of Soy.
Kurzer, et al., "Dietary Phytoestrogens", Annu. Rev. Nutr. 1997, 17: 353–81.
Ultra Slim Fast, http://www.slimfast.com/products/lactose-.asp.
Federal Register, Part II, 21 CFR Part 101 Food Labeling: Health Claims; Soy Protein and Coronary Heart Disease; Final Rule; Department 6 Health and Human Services, Food and Drug Administration.
*Role of the Gut Flora in Toxicity and Cancer* New York, Academic Press, 1988; pp. 31545, by Setchell and Adlercreutz.
"Naturally Ocurring Oestrogens in Foods—A Review" by Price and Fenwick, Food Additives and Contaminants, vol. 2, No. 2, pp. 73–106, 1985.
Murphy, et al., "Isoflavones in SoyBased Infant Formulas", Journal of Agricultural and Food Chemistry, vol. 45, 1997, pp. 4635–4638.
Alder–Nissen, J., "Determination of the Degree of Hydrolysis φ Food Protein Hydrolysates by Trinitrobenzenesulfonic Acid", J. Agric. Food Chem., vol. 27, No. 6, 1979, pp. 1256–1262.
Ensure®, Ross Products Division, Abbott Laboratories.
HealthSource® Soy Protein Shake Powder, Ross Products DivisionAbbott Laboratories.

* cited by examiner

*Primary Examiner*—Carolyn Paden
(74) *Attorney, Agent, or Firm*—William J. Winter; Thomas D. Brainard

(57) ABSTRACT

The present invention relates generally to a thin texture, ready-to-drink, shelf-stable refreshing juice/soy beverage. Other aspects of this invention relate to methods of providing phytochemicals from soy, fruit and vegetable juices to a health conscious population.

27 Claims, No Drawings

JUICE AND SOY PROTEIN BEVERAGE AND USES THEREOF

CROSS REFERENCE

This application is a continuation-in-part of U.S. Patent Application Ser. No. 60/296,614 which was filed on Jun. 7, 2001.

TECHNICAL FIELD

The present invention relates generally to a thin texture, ready-to-drink, shelf-stable refreshing juice/soy beverage. Other aspects of this invention relate to methods of providing phytochemicals from soy, fruit and vegetable juices to a health conscious population.

BACKGROUND OF THE INVENTION

Many of the "active components" identified in fruits and vegetables are phytochemicals. A number of these compounds have been identified in fruits and vegetables commonly consumed by humans.

There are at least a dozen groups of compounds classified as phytochemical. Most commonly studied groups of phytochemicals are flavonoids, glucosinolates, phenolic compounds, isoprenoids, terpenoids, organosulfuric compounds, lignans and indoles. They may be subdivided into smaller subclasses depending on their chemical structures.

Phytochemicals include isoflavones which occur in a variety of leguminous plants. Soybeans are the most significant dietary sources of isoflavones. Isoflavones have been detected and identified in biological fluids of humans consuming the plant material. Due to the phenolic structure, which is similar to those of animal estrogens, these compounds exhibit weak estrogenic properties and are termed phytoestrogens. It is the isoflavones which have received the most attention and have been reviewed in great detail in "Mammalian lignans and phyto-oestrogens—Recent studies on their formation, metabolism and biological role in health and disease" by Setchell and Adlercreutz, Role of the Gut Flora in Toxicity and Cancer. New York, Academic Press, 1988; pp 315–45; "Naturally Occurring Oestrogens in Foods—A Review" by Price and Fenwick, Food Additives and Contaminants, Vol. 2, No. 2, pp73–106,1985; and "Dietary Phytoestrogens" by Kurzer and Xu, Annual Review of Nutrition Vol 17,1997; pp 353–81.

Studies in humans, animals and cell culture systems suggest that dietary phytoestrogens play an important role in prevention of menopausal symptoms, osteoporosis, cancer, and heart disease. Proposed mechanisms include estrogenic and antiestrogenic effects, induction of cancer cell differentiation, inhibition of tyrosine kinase and DNA topoisomerase activities, suppression of angiogenesis and antioxidant effects. The major isoflavones occurring in plants are the glycosides of genistein, daidzein and glycitein.

Isoflavones isolated from soy have become the focus of much research in the areas of heart disease, cancer, osteoporosis and kidney diseases. This research has resulted in the Food and Drug Administration (FDA) authorizing the use of a food labeling health claim for the association between soy protein and the reduced risk of coronary heart disease (CHD) (21 CFR Part 101, Section 101.82). According to the health claim approved by the FDA, 25 grams of soy protein per day, as part of a heart-healthy diet low in saturated fat and cholesterol, may reduce the risk of heart disease.

This expanding knowledge in the possible role of soy and its fractions in the nutritional management of disease states has presented practical challenges for the average consumer in the market place. The primary challenge is access to good tasting products with naturally high concentrations of isoflavones.

The isoflavone contents in commercial soy raw ingredients vary depending on the levels of isoflavones in the plant variety and processing procedures. For example, approximately 90% of phytoestrogens present in soy foods are beta-glucoside conjugates of daidzein and genistein. However, in fermented soy products, the aglucones (unconjugated) are the predominant forms. The nutrient and isoflavone content of the most common available soy foods, soy ingredients and nutritionals are listed in Table 1 below.

TABLE 1

Nutrient and Isoflavone Content of Different Soy Foods and Ingredients*

| Soy food | Calories Kcal | Soy Protein g (% of Cal.) | Fat g (% of Cal.) | Estimated Isoflavone mg |
|---|---|---|---|---|
| Miso (1 oz) | 35 | 2 (23) | 1 (25) | 10 |
| Soybeans, cooked (½ cup) | 149 | 14 (37) | 8 (48) | 35 |
| Soy flour (3½ cup) | 441 | 35 (32) | 22 (45) | 50 |
| Soymilk (1 cup) | 140 | 10 (28) | 4 (26) | 40 |
| Soymilk, low-fat (1 cup) | 120 | 8 (26) | 3 (22) | 40 |
| Soy nuts, dry roasted (½ cup) | 387 | 34 (35) | 19 (44) | 50 |
| Soy protein isolate (1 oz) | 94 | 25 (100) | 1 (9) | 15 |
| Tempen (4 oz) | 204 | 17 (33) | 8 (35) | 40 |
| Tofu, low-fat (3 oz) | 35 | 6 (68) | 1 (25) | 30 |
| Tofu, extra-firm (3 oz) | 60 | 6 (40) | 3 (45) | 45 |
| Textured Vegetable Protein (¼ cup,dry) | 59 | 11 (74%) | 0 (0) | 35 |
| Ensure (8 fl. oz.) | 250 | 8.8 (14) | 6.1 (22) | 2.6 |
| GeniSoy ™ (35 gm) | 130 | 14 (43) | 0 (0) | 14–70** |
| Health Source ™ (29 gm) | 100 | 20 (76) | 1 (9) | 55 |
| Ultra Slim-Fast ® (340 mL) | 220 | 7 (13) | 1 (0.04) | NA*** |

*Table adapted from US Department of Agriculture Handbook 8
**Based on GeniSoy ™ literature which describes a typical isoflavone range from 1.0–5.0 mg isoflavone/gram soy protein, assuming 100% of the protein is soy protein containing isoflavone.
***not available, Ultra Slim-Fast ® literature does not state isoflavone content.

While there are a few soy-based foods available on the market today, they are not easily incorporated into an individual's diet. Accessibility of the products listed in Table 1 is an issue for most of the general population. A few of the products are starting to be stocked in standard grocery stores; however, many must be purchased in "Health Food Stores". More importantly, the taste and texture of soy products are objectionable to many individuals that have not grown up with soy protein in their diets. In addition, most of the foods in Table 1 are ingredients to be incorporated into a food dish and most individuals do not know how to incorporated these ingredients into their food. While the roasted soy nuts, which would probably be an acceptable snack food for most individuals, weigh in with a high isoflavone content, the high calorie and fat content are unacceptable for daily incorporation into an individual's diet. Soy milk is a reasonable source of isoflavones and has been used by individuals with cow milk allergies for many years and there are currently more flavors and fat content options to chose from. A serving (1 cup) of "Light" soy milk contains 3 grams of fat and 8 grams of protein in 120 total calories. No inherent vitamins and a small amount of calcium and iron (2% of the RDI) are present in soy milk. A serving (1 cup) of full fat soy milk contains 4 grams of fat and 10 grams of protein in 140 total calories. The requirement for refrigerated storage and the flavor of soy milk remain a major obstacle for the average consumer.

The liquid nutritional, Ensure® (Ross Products Division of Abbott Laboratories, Chicago, Ill.), a good tasting, shelf stable, ready to drink complete nutritional with a protein system that contains soy protein isolate, is an alternative to the more traditional soy foods. However, only 20% of the total protein system is soy protein isolate resulting in an isoflavone content too low to practically provide the benefit of consuming soy protein.

GeniSoy™ is a powdered protein shake manufactured by GeniSoy Products Co. (Fairfield, Calif.) with water processed isolated soy protein. A serving (8 oz.) of the Vanilla product contains 14 gm of soy protein, zero fat and 18 gm of total carbohydrate in 130 calories. The vitamins and minerals are fortified at 25% of the RDI with the exception of vitamin E (170% of the RDI). GeniSoy Products literature states that although the isoflavone content of GeniSoy is not tested, typical isoflavone values for water processed soy protein isolate range from 1.0 to 5.0 mg of isoflavone/gram soy protein isolate. While this vitamin and mineral fortified product provides large amounts of soy protein isolate in a single serving, the inconvenience of the powder form and the soy flavor remain an issue for many consumers.

Health Source™ is a powdered protein shake distributed by Ross Products, Division of Abbott Laboratories (Chicago, Ill.) with water processed isolated soy protein. A serving (44 gm powder) of the chocolate product contains 26 gm of soy protein, 2 gm of fat and 8 gm of total carbohydrate in 150 calories. Among other vitamin and mineral fortifications, the product is fortified with 60% of the daily value for calcium and 30% of the daily value for vitamin D to help maintain bone health. There is 80 mg of isoflavones in one serving of Health Source™. While this vitamin and mineral fortified product provides large amounts of isoflavones in a single serving, the inconvenience of the powder form and the soy flavor remain an issue for many consumers.

Ultra Slim-Fast™ juice based shakes (distributed by Slim-Fast Foods Co., West Palm Beach, Fla.) contain 7 grams of soy protein, 1 gram of fat, 44 grams of total carbohydrates in 220 calories. Depending on the product flavor, there is 4 to 6% total fruit juice. Vitamins and minerals are fortified from 25% to 100% of the Daily Value (DV). The percent Daily Values are based on a 2,000 calorie diet. While this vitamin and mineral fortified juice based product provides soy protein, the level is too low to easily achieve the recommended 25 grams a day without also consuming the undesirable additional calories.

Isoflavone compounds are associated with the inherent bitter flavor of soybeans. Consequently, in the production of commercial products, such as isolates and concentrates, the focus has been traditionally to remove these materials. For example, in a conventional process for the production of a soy protein isolate, in which soy flakes are extracted with an aqueous alkaline medium, much of the isoflavones are solubilized in the extract, and remain solubilized in the whey, which is usually discarded following acid precipitation of the protein to form an isolate. Residual isoflavones left in the acid precipitated protein isolate are usually removed by exhaustive washing of the isolate. This process has been modified to maintain and enrich the isoflavone content of the vegetable isolates, concentrates, protein fiber and whey.

EP 0 647 408 by Shen, et al., teaches how to manufacture an isoflavone enriched vegetable protein isolate by extracting a vegetable protein material containing isoflavones at a pH above the isoelectric point of the material, then adjusting the pH to about the isoelectric point of the protein material resulting in a precipitate, then doing limited washing of the precipitate to provide an isoflavone enriched protein isolate.

U.S. Pat. No. 5,637,562 by J. L. Shen discloses a process to manufacture isoflavone enriched vegetable protein concentrate through an isoelectric wash of a vegetable protein material to provide a protein concentrate, which is slurried and reacted with a sufficient amount of beta-glucosidase enzyme or esterase enzyme for a time period, temperature and pH sufficient to convert at least a majority of the glucone isoflavones contained in the concentrate to aglucone isoflavones.

U.S. Pat. No. 5,352,384 by J. L. Shen discloses a process to manufacture isoflavone enriched vegetable protein fiber. The starting material is extracted at a pH above the isoelectric point of the protein material, the aqueous slurry containing the solubilized isoflavones is reacted with a beta-glucosidase to convert the isoflavones in glucone form to an aglucone isoflavone making the isoflavones less soluble, the fibrous residue is recovered to provide a vegetable fiber product which has been enriched with aglucone isoflavones.

U.S. Pat. No. 5,637,561 by J. L. Shen discloses a process to make aglucone isoflavone enriched vegetable protein whey by treating the whey stream, comprising glucone isoflavones, with a sufficient amount of beta-glucosidase enzyme or esterase enzyme or acid to convert at least a majority of the glucone isoflavones to aglucones thereby providing an aglucone enriched whey stream. The aglucone enriched whey protein is obtained by recovery of the protein.

Modern consumers not only desire that their beverages be refreshing and tasty, they also desire some level of nutritional supplementation, especially for the important vitamins and minerals such as calcium, iron, Vitamin C, the B vitamins, and folic acid. As the importance of fruit and vegetable consumption is repeatedly stressed in experiment after experiment, consumers are starting to supplement their diet with nutritionally beneficial beverages enriched in the desired "active components" such as phytochemicals. However, for the consumer to continue to consume the nutritionally beneficial beverage, the beverage must taste good and have a refreshing character. The Inventors discovered that the addition of juice to soy protein, helps mask the typically undesirable taste of soy protein.

Juice beverages are well known in the art. U.S. Pat. No. 4,992,282 to Mehansho, et al., discloses vitamin- and mineral-fortified beverages that are stable and contain Vitamin A in the form of encapsulated beta carotene, Vitamin C, and riboflavin. The beverages according to this reference also contain at least 3% by weight fruit juice. The fruit juices disclosed include grape, pear, passion fruit, cherry, pineapple, banana, grapefruit, apple, cranberry, and mixtures thereof.

U.S. Pat. No. 4,486,413 to Wisenberger, et al., discloses a protein-containing drink with a pH of 4.0 to 5.0 consisting essentially of 30–90 wt. % of a fruit juice or a mixture of fruit juices having a solids content of 4–20 wt. %; 2–20 wt. % of a whey concentrate corresponding to a whey protein content of 1.2–5 wt. % wherein the lactose content of the whey concentrate has been enzymatically cleaved; and mineral salts and vitamins.

U.S. Pat. No. 4,871,554 to Kalala, et al., is directed to a calcium-fortified beverage comprising water, concentrated fruit juice, and a solubilized calcium component consisting of tribasic calcium phosphate and calcium lactate.

U.S. Pat. No. 4,722,847 to Heckert discloses a calcium-supplemented single-strength fruit juice beverage that contains about 0.06% to about 0.26% by weight solubilized calcium, from about 0.4% to about 4% by weight of a mixture of citric acid and malic acid at weight ratios of from about 5:95 to about 90:10, respectively.

EP Patent 486,425 to Sandoz Nutrition Ltd., discloses a liquid formulation comprising, based on the total formulation calories, from 40%–90% of the calories as carbohydrates, from 2%–30% of the calories as protein, from 0%–35% of the calories as fat and from 0%–17% of the calories as fiber wherein the protein source is at least 60% by weight whey protein concentrate and the pH of the formulation is from 3.5 to 3.9.

U.S. Pat. No. 5,641,531 to Liebrecht, et al., discloses a protein-containing nutritional supplement that is essentially devoid of added macronutrients and fat. This patent teaches that a clear, low viscosity beverage can be produced by: 1) preparing an acidified, aqueous solution of whey protein isolate at a pH of about 2.8 to about 3.3; 2) preparing an aqueous solution of carbohydrates; and 3) thereafter combining the two solutions.

U.S. Pat. No. 3,692,532 to Shenkenberg, et al., discloses a stable milk-fruit juice beverage consisting essentially of milk, fruit juice, sweetener and sodium carboxymethylcellulose (NaCMC) wherein the beverage has a viscosity of less than 30 cps and is stable at pH levels below 5.0. This patent teaches that sufficient time be allowed for the carboxyl groups of the carboxymethylcellulose (CMC) to react with the casein molecules to form a complex which results in a stable, free flowing, non-congealing, low-viscosity beverage.

U.K. Patent 1,440,161 to Nishiyama teaches a milk-fruit juice beverage which contains 4.2–6.2 w/v % of NaCMC as a stabilizer to prevent the coagulation of milk protein, 10–50 w/v % of a fruit juice and 3.1–5.0 w/v % of citric, lactic, malic or tartaric acid. In the process of Nishiyama, the NaCMC is added to hot water with vigorous agitation at neutral pH and then the juice is added. After cooling, the solution is acidified with the recited food grade acid. No additional protein, fat, carbohydrates, minerals and/or vitamins are added to the beverage. In a related case, U.S. Pat. No. 4,078,092, Nishiyama discloses a milk-apple juice drink having a pH of 3.6–4.5 wherein 100 ml of the drink contains 4.2–6.0 gms of a carboxylic acid.

The importance of isoflavone enriched vegetable protein sources becomes more apparent when one reviews the field of isoflavone research. Most of the human research on isoflavones has been carried out by incorporating soy products into the typical American diet or studying Asian countries where soy is a normal part of the diet. While the health benefits of soy have been attributed to isoflavones, the actual active compound or compounds have yet to be identified. The level and ratio of the isoflavones in addition to other inherent components of soy may play an important role in the health benefits attributed to soy. However, there are dietary supplement patents incorporating isolated phytoestrogens into compositions for the management of osteoporosis and premenstrual syndrome.

A product containing isoflavones for the management of osteoporosis is described in U.S. Pat. No. 5,424,331 by M. Shlyankevich which discloses a pharmaceutical or dietary supplement for the treatment or prevention of osteoporosis. The composition comprises phytoestrogen compounds; dried licorice root extract; calcium, magnesium and zinc salts; beta carotene; and vitamin D and E in an acceptable inert carrier.

A product containing isoflavones for the management of premenstrual syndrome is described in U.S. Pat. No. 5,569,459 by M. Shlyankevich which discloses a pharmaceutical or dietary supplement for controlling the stimulation of estrogen production. The composition comprises phytoestrogen compounds; dried licorice root extract; a sedative selected from the group consisting of Balerian root dry extract, passion flower dry extract and Ginseng root powder; beta-carotene; pyridoxine hydrochloride; Vitamin E; calcium, magnesium and zinc salts; coumestan; and pantothenic acid in an acceptable inert carrier.

A dietary supplement for supplementing the nutritional needs of women and preventing or reducing life stage associated health risks during each of their principal adult life stages (pre-perimenopause, perimenopause and menopause, or post-menopause) is described in U.S. Pat. No. 5,654,011 by S. D. Jackson, et al. The dietary supplement comprises calcium, magnesium, boron, copper, manganese, zinc, vitamin D, E and C; iron, folic acid, vitamin $B_{12}$ and $B_6$; chromium, and phytoestrogens in a biologically acceptable carrier.

As discussed above, there are several soy and juice products currently available to the consumer. However, as the soy protein content increases the desirable taste and mouth feel characteristics decrease. Many of the products require special storage conditions such as refrigeration or are in powder forms requiring an additional reconstitution step before consumption. Further, while some of the juice products are fortified with vitamins or protein, they do not contain sufficient levels of isoflavones.

Clearly, there is need for a ready-to-drink, shelf stable, good tasting soy/juice product that will deliver high levels of inherent phytochemicals to an individual choosing to supplement their diet with a soy/juice beverage.

SUMMARY OF THE INVENTION

The present invention relates generally to a shelf stable, ready-to-drink (RTD), soy/juice beverage useful for providing phytochemicals from soy, fruit and vegetable juices to a health conscious population.

One aspect of the invention is a beverage containing a protein system providing from about 10% to about 30% of the total calories of the beverage, preferably from about 13% to about 25% of the total calories of the beverage; a carbohydrate system which provides from about 70% to about 90% of the total calories of the product, preferably from about 75% to about 87% of the total calories of the beverage; and a vitamin system in quantities sufficient to provide at least 10% of the RDI of one or more vitamins in a single serving. An optional lipid system may be included to act as a carrier for the fat soluble vitamins. The carbohydrate caloric contribution is decreased to compensate for the additional fat calories. The optional lipid system provides less than about 6% of the total calories of the beverage. The beverage has a caloric density of from about 0.4 kcal/ml to about 1.0 kcal/ml, preferably from about 0.4 kcal/ml to about 0.7 kcal/ml and a viscosity of from about 10 to about 250 centipoise (cps), preferably from about 10 to 35 cps.

The protein system contains from about 30% to 100% (% wt.) soy protein, preferably from about 50% to 100% soy protein. The soy protein is selected from the group including soy flakes, soy protein isolate, soy protein concentrate, hydrolyzed soy protein, soy flour, soy protein fiber, soy whey and mixtures thereof. Preferably, the soy protein comprises from about 0.5 to about 5 mg isoflavones/gm soy protein, more preferably from about 1 mg to about 4 mg isoflavones/gm soy protein.

The optional lipid system may be selected from the group including high oleic safflower oil, soy oil, fractionated coconut oil, high oleic sunflower oil, corn oil, canola oil and mixtures thereof. Preferably, the optional lipid system is 100% canola oil.

The carbohydrate system may be selected from the group including hydrolyzed corn starch, maltodextrin, glucose polymers, sucrose, corn syrup solids, glucose, fructose, lactose, high fructose corn syrup, cane juice solids, honey, fructooligosaccharides, fruit or vegetable juices, fruit or vegetable puree and mixtures thereof. Preferably, the carbohydrate system comprises sufficient fruit juice, vegetable juice or mixtures thereof to provide from about 10 to 90 wt/wt % of the total beverage, more preferably from about 20 to 70 wt/wt % of the total beverage.

The fortified vitamins and minerals for the beverages of this invention comprises one or more of the vitamins A, $B_1$, $B_2$, $B_6$, $B_{12}$, C, D, E, K, Biotin, Folic Acid, Pantothenic Acid, Niacin; and the mineral calcium. Preferably the vitamins are fortified from about 10% to 30% of the RDI in a single serving. Calcium is fortified from about 10% to about 70% of the RDI in a single serving. Additional minerals, such as zinc, copper, manganese, magnesium, and iron are typically provided in inherent levels from the other ingredients.

A second embodiment of the invention is a method for providing soy protein containing inherent isoflavones to an individual by feeding the beverage described above.

A third embodiment of the invention is a method for providing phytochemicals to an individual by feeding the individual the beverage described above.

The beverages of this invention may also be manufactured with organic/natural ingredients. A natural or organic product complements the health benefits of the soy protein/isoflavones. Attention to the way the source material is grown, processed and handled identifies the ingredients allowed in a natural or organic product.

DETAILED DESCRIPTION OF THE INVENTION

As utilized herein:

a. any reference in this patent application to the "RDI for vitamins and minerals" refers to the list published in the 1993 Federal Register, Vol. 58. RDIs are a set of dietary references based on the Recommended Dietary Allowances (RDA) for essential vitamins and minerals. The name "RDI" replaces the term "U.S. RDA" (Recommended Daily Allowances). Recommended Dietary Allowances (RDA) are the set of estimated nutrient allowances established by the national Academy of Sciences used as the basis for setting the U.S.RDAs. It is updated periodically to reflect current scientific knowledge.

b. the term "total calories" refers to the total caloric content of a predetermined volume of the finished beverage. For example, a product with 13 gm of protein(4 kcal/gm), 1 gm of fat(9 kcal/gm) and 27 gm of carbohydrate(4 kcal/gm) has 169 total calories per 237 ml.

c. the term "isoflavones" refers to the compounds having the following general formula, with specific compounds identified in Table 2.

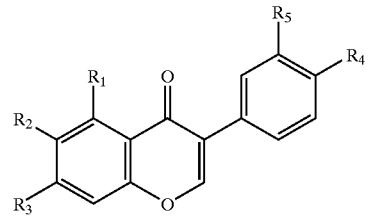

TABLE 2

Chemical structures of isoflavones found in soybeans.

| Isoflavone | $R_1$ | $R_2$ | $R_3$ | $R_4$ | $R_5$ |
|---|---|---|---|---|---|
| Daidzein | H | H | OH | OH | H |
| Genistein | OH | H | OH | OH | H |
| Glycitein | H | $OCH_3$ | OH | OH | H |
| Daidzin | H | H | O-glucoside | OH | H |
| Genistin | OH | H | O-glucoside | OH | H |
| Glycitin | H | $OCH_3$ | O-glucoside | OH | H |

As described in Table 2, daidzin, genistin and glycitin are the beta-glucoside conjugate (glucones) moieties. Daidzein, genistein and glycitein are the unconjugated (aglucones) moieties. As used herein "daidzein, genistein and glycitein levels" include both the conjugated and unconjugated moieties. The typical ratio of genistein to daidzein to glycitein in soy protein is 67 to 30 to 3.

d. the term "soy protein or soy protein source" refers to any protein form derived from soybeans including, for example, soy flakes, soy protein isolate, soy protein concentrate, hydrolyzed soy protein, soy flour and soy protein fiber.

e. the term "total isoflavone content" refers to the total amount of genistein, daidzein, glycitein and their glucoside moieties.

f. the Brix scale refers to a hydrometer scale for sugar solutions so graduated that its readings at a specified temperature represent percentages by weight of sugar in the solution. Brix levels for single strength and concentrates of fruit juices are specified by law in many countries. All fruit juices referred to herein may be single-strength or concentrated. Degrees Brix (°Brix) is expressed as grams of soluble solids per 100 gm of juice and is determined either with a refractometer or a Brix hydrometer and is temperature corrected.

g. °Brix:acid ratio, degree Brix:acid ratio, Brix:acid ratio, sweetness:tartness ratio all refer to the ratio of the Brix reading to the total titratable acidity expressed as percentage of citric acid (°Brix:acid ratio) is a measure of juice sweetness.

h. the term "genetically engineered" or "genetically modified organisms" (GMO) refers to ingredients made by techniques that alter the molecular or cell biology of an organism by means that are not possible under natural conditions or processes. Genetic engineering includes recombinant DNA, cell fusion, micro- and macro-encapsulation, gene deletion and doubling, introducing a foreign gene, and changing the positions of genes. It shall not include breeding, conjugation, fermentation, hybridization, in-vitro fertilization and tissue culture.

i. the method used to analyze isoflavones in the final product utilizes the published extraction procedure of Murphy et al., Isoflavones in Soy-Based Infant Formulas, *Journal of Agricultural and Food Chemistry*, Vol 45, 1997, pp. 4635–4638. The nonpolar nature and the intense UV absorptivities of these compounds make reversed phase HPLC a suitable approach for their determination in a variety of foods. An acidic 50/50 acetonitrile/water solution is used to extract the isoflavones from lyophilized product. The filtered extract is diluted with a buffered beta-glucuronidase solution, which rapidly affects the conversion of all conjugated forms (the "glucones") of each isoflavone to the unconjugated form (the "aglucones" daidzein, genistein and glycitein). The aglucones are then separated by reversed phase chromatography, and detected by UV absorbance at 250 nm (daidzein) and at 262 nm (genistein). The aglucone concentrations are then determined by peak area proportionation versus solutions of specialized chemical reference standards of known concentrations. Glycitein values are estimated from the genistein standard response at 262 nm as there is no glycitein standard available.

j. the term "degree of hydrolysis" (DH) refers to the percentage of peptide bonds cleaved. For example, if an intact protein containing five hundred peptide bonds is hydrolyzed until fifty of the peptide bonds are cleaved, then the DH of the resulting protein hydrolyzate is 10%. The method utilized to determine DH is the TNBS colorimetry method described in Adler-Nissen, J., "Determination of the Degree of Hydrolysis of Food Protein Hydrolysates by Trinitrobenzenesulfonic Acid", *J. Agric. Food Chem.*, Vol. 27, No. 6, 1979, pg. 1256–62, incorporated herein by reference. The method determines the concentration of alpha-amino groups, as milliequivalents/gram (mEq/g) of protein, in the sample. The alpha-amino groups are measured by TNBS colorimetry; i.e., by the spectrophotometric assay (at 416 nm) of a visible chromophore formed by the reaction of trinitrobenzenesulfonic acid (TNBS) with primary amines to form trinitrobenzene amines (the chromophores) and sulfurous acid. The higher the DH, the greater the extent of protein hydrolysis. Typically, as the protein is further hydrolyzed (higher DH), the average molecular weight decreases, the peptide profile changes accordingly and the viscosity decreases.

It is a principal object of the invention to provide an improved soy-based beverage for individuals who wish to increase their daily fruit and vegetable intake. The invention provides a shelf stable, ready-to-drink, good tasting beverage which utilizes a soy protein, fruit juice, vegetable juice system containing inherent levels of phytochemicals.

The beverage of this invention will typically provide the following caloric distribution. The protein system will typically provide from about 10% to about 30% of total calories, more preferably from about 13% to about 25% of total calories. The carbohydrate system will typically provide from about 70% to about 90% of total calories, more preferably from about 75% to about 87% of total calories. Optionally, less than about 6% of the total calories of the beverages of the present invention are provided by a fat system. The caloric density is typically from about 0.40 kcal/ml to about 1.0 kcal/ml, preferably from about 0.40 kcal/ml to about 0.7 kcal/ml.

One component of the beverages of this invention is soy protein. As described above, a number of soy protein sources may be considered. The soy protein is derived from the soybean. The soybean is an excellent source of high quality protein where about 38% to 40% of the soybean is protein. Briefly (as shown in Scheme I), the processing of soybeans involves the extraction of the oil from the dehulled, and cracked soybeans leaving the defatted soybean flakes.

Scheme 1
Soybean Processing

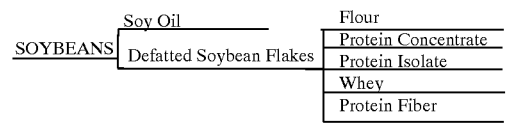

The defatted soybean flakes are typically milled into flours; alcohol-extracted or alkoline/$H_2O$ extracted to remove flavor compounds and sugars to make protein concentrates; and processed with water to remove sugars and flavor compounds, precipitated and dried to make protein isolates. Whey and protein fiber are by-products of the above processes. The preferred soy protein is processed in a manner to enrich the isoflavone content so that total isoflavone content (glucone and aglucone forms of genistein+ daidzein+glycitein) is at least 0.5 mg isoflavones/gram soy protein. Acceptable soy protein sources are listed in the attached Examples. Preferred methods to produce isoflavone enriched vegetable protein were discussed briefly in the Background when reviewing production methods of isoflavone enriched soy protein described in EP 0 647 408, U.S. Pat. No. 5,637,562, U.S. Pat. No. 5,352,384, and U.S. Pat. No. 5,637,561 all by J. L. Shen.

The protein system contains from about 30 to 100 wt/wt % soy protein, preferably from about 50 to 100 wt/wt % soy protein. The soy protein is selected from the group including soy flakes, soy protein isolate, soy protein concentrate, hydrolyzed soy protein, soy flour, soy protein fiber, soy whey and mixtures thereof. Preferably, the soy protein comprises from about 0.5 to about 5 mg isoflavones/gm soy protein, more preferably from about 1 mg to about 4 mg isoflavones/gm soy protein.

The remaining portion of the protein system may be provided by any protein suitable for humans, taking into account any relevant requirements (i.e. non-GMO). Examples of suitable proteins that may be utilized typically include casein, whey, milk protein, pea, rice, corn, hydrolyzed protein and mixtures thereof. Commercial protein sources are readily available and known to one practicing the art. For example, caseinates, whey, hydrolyzed caseinates, hydrolyzed whey and milk proteins are available from New Zealand Milk Products of Santa Rosa, Calif. Pea protein is available from Feinkost Ingredients Company of Lodi, Ohio. Rice protein is available from California Natural Products of Lathrop, Calif. Corn protein is available from EnerGenetics Inc. of Keokuk, Iowa.

A smooth, thin, refreshing mouth feel are all desirable characteristics for the beverages of the instant invention. Protein characteristics play a major role in the mouth feel of the beverage. Low viscosity soy protein is typically the preferred source of soy protein. Soy protein viscosity is related to degree of hydrolysis. The preferred degree of hydolysis (DH) is below about 15%, more preferably from about 1 to about 6%.

A natural or organic version of the beverages of this invention incorporates soy protein isolated from non-GMO soy beans.

The second component of the beverages of this invention is a source of carbohydrates. The carbohydrates that may be used in the beverage can vary widely. Examples of suitable carbohydrates that may be utilized include hydrolyzed corn starch, maltodextrin, glucose polymers, sucrose, corn syrup solids, glucose, fructose, lactose, high fructose corn syrup, cane juice solids, honey, fructooligosaccharides, fruit puree, fruit juice, vegetable puree, vegetable juice and mixtures thereof. Typically, the carbohydrate system comprises sufficient fruit juice, vegetable juice or mixtures thereof to provide from about 10 to 90 wt/wt % of the total beverage, preferably from about 10 to 70 wt/wt % of the total beverage, more preferably from about 20 to 50 wt/wt % of the total beverage. In addition to the carbohydrate inherently present in the juice, additional quantities of supplemental carbohydrates may be optionally added to the beverage, depending upon the desired sweetness level of the beverage. Artificial sweeteners such as saccharin, sucralose, acelphame-K, aspartame and mixtures thereof may also be used to enhance the organoleptic quality of the beverage. Such variations are well known to those skilled in the art and such manipulations are intended to be covered by this invention.

Examples of suitable fruit sources typically include fruit juice, juice concentrates, fruit puree and blends thereof including apple, apricot, banana, blackberry, blueberry, boysenberry, melon, cherry, cranapple, cranberry, current, elderberry, grape, grapefruit, honeydew, kiwi, lemon, lime, mango, nectarine, orange, papaya, passion fruit, peach, pineapple, plum, pomegranate, prune, raspberry, strawberry, tangerine, tomato, and watermelon.

Examples of suitable vegetable sources typically include vegetable juice, vegetable juice concentrates and blends thereof including tomato, carrot, celery, parsley, watercress, cabbage, broccoli, beet, cucumber, bell pepper and spinach.

Sugars and organic acids are major constituents of the soluble substances in juices. Sugars mainly consist of glucose, fructose and sucrose. Organic acids are mainly citric acid, malic acid and tartaric acid depending on the kind of fruit. The presence of acids is responsible for the low pH values of fruit juices. Since the °Brix:acid ratios of fruit juices are normally in the range of 10 to 20, the fruit juice concentrates can be considered as concentrated sugar-acid solutions.

The beverage of the instant invention is a high acid product resulting in tart flavors. The carbohydrate and acid systems have been designed to balance the sweetness/tartness ratio (°Brix:acid) for each fruit flavored beverage. Typically the sweetness/tartness ratio ranges from about 10 to about 40, preferably from about 15 to about 25.

A natural or organic version of the beverages of this invention incorporates carbohydrates isolated from non-GMO sources. Natural Sugars distributed by Florida Crystals (Palm Beach, Fla.) is a minimally-processed natural sugar source. The juice is pressed from freshly-cut sugarcane, washed, filtered and crystallized. The product contains no artificial additives or preservatives.

An optional component of the beverages of this invention is the fat system. As stated above, less than 6% of the total calories of the beverages of the present invention are provided by this fat system. Any of the typical fat sources could be used such as high oleic safflower oil, soy oil, fractionated coconut oil, high oleic sunflower oil, corn oil, canola oil and mixtures thereof. The preferred fat system is 100% canola oil. When fat is added, carbohydrate calories are decreased to compensate for the additional fat callories.

A natural or organic version of the beverages of this invention will incorporate the fat sources listed above, where said fat sources have been extracted according to non-chemical means, for example mechanically pressed (expeller pressed), hydraulic pressed, or stone pressed. Mechanical pressing, also known as expeller pressing, removes oil through the use of continuously driven screws that crush the seed or other oil-bearing material into pulp from which the oil is expressed. In addition to a preferred extraction method for the fats of a natural or organic beverage, the starting material are non-GMO sources.

The third component of the beverages of the present invention includes supplemented vitamins and calcium. The vitamin profile provides at least 10% of the RDI for one or more vitamins in a single serving, preferably from about 20% to about 30% of the RDI for one or more vitamins in a single serving. The vitamin system for the beveages of the invention typically comprises one or more of the vitamins A, $B_1$, $B_2$, $B_6$, $B_{12}$, C, D, E, K, Biotin, Folic Acid, Pantothenic Acid, and Niacin. Preferably, the calcium is fortified from about 10% to 70% of the RDI for calcium in a single serving. Additional minerals, such as zinc, copper, manganese, magnesium, and iron are typically provided in inherent levels from the other ingredients, such as the protein and juice sources.

The use of synthetic vitamins, minerals and/or accessory nutrients in products labeled as organic are limited to that which is required by regulation or recommended for enrichment and fortification by independent professional associations. "Accessory nutrients" refer to nutrients not specifically classified as a vitamin or mineral but found to promote optimal health. Examples include omega-3 fatty acids, inositiol, choline, isoflavones and taurine.

Product stability and mouth feel is improved by using one or more stabilizers. Various food stabilizers can be employed in the present invention and include hydrophilic colloidal stabilizers known as gum arabic, pectins, gelatin, and xanthan as well as the anionic polymers derived from cellulose such as carboxymethyl cellulose. These stabilizers are water soluble and tolerate a low pH which is encountered in the inventive beverage.

Pectins are preferably used in the present invention to enhance physical stability and control the viscosity of the beverages. The pectin stabilizes the soy proteins to yield products without significant sedimentation and phase separation (i.e., physical stability) and ensures a smooth mouth feel without any "sandiness" and they help control viscosity by stabilizing free water. Pectins are a class of complex polysaccharides found in the cell walls of higher plants. The number of plant sources that are used for the commercial production of pectins is fairly limited. At present, apple pomace and citrus peels are the main sources of commercially acceptable pectins. They, however, produce slightly different pectins, which make one or the other more suitable for specific applications. Other sources of pectin include sugar beets and the seed heads of sunflowers.

The ability of pectins to form a gel depends on the molecular size of the molecule and the degree of methoxylation (DM). The chemical structure of pectin has been the subject of many scientific investigations. Elucidation of pectin structure is important to understanding its role in food processing and as a nutritional fiber. Like most other polysaccharides, pectins are both polymolecular and polydisperse; that is, they are heterogeneous with respect to both chemical structure and molecular weight.

The composition of pectin varies with the source and conditions of extraction, location, and other environmental factors. Based on solubility, two different types of pectins exist: water-soluble or "free pectin" and the water-insoluble pectins. Solubility in water is related to the degree of polymerization and the number and distribution of methoxyl groups.

The most unique property of pectins is their ability to form gels in the presence of $Ca^{2+}$ ions or sugars and acid. Depending on the DM, pectins are classified into: 1) low methoxy (LM) pectin with a DM of 25–50% and 2) high methoxy (HM) pectin of 50–80% DM. LM and HM pectins form gels in the presence of calcium ions and acid, respectively. The mechanism of gel formation is different in both HM and LM pectins.

Pectins have always been a natural constituent of human foods and its use is allowed in all the countries of the world. Pectin has been used in a number of foods such as jellies, preserves, jams, dietetic soft drinks, ice cream and as a fat or sugar replacement in low-calorie foods. Pectins also have uses in the pharmaceutical industry.

The pectins useful in the present invention are the LM pectins and are available from The Copenhagen Pectin Factory Ltd. of Denmark and Hercules Food Ingredients, Wilmington, Del. The concentration of the LM pectin used herein can typically range from about 0 to about 1% by weight, more preferably from about 0.2 to about 0.3% by weight. This level of stabilizers will result in a preferred viscosity ranging from about 10 to about 250 centipoise (cps), more preferably from about 10 to about 35 cps.

As noted above, the pH of the beverages of this invention should range from about 2.0 to about 7.0. This pH range can be obtained by the addition of food grade acids such as hydrochloric acid, malic acid, citric acid, acetic acid, tartaric acid, lactic acid, lemon juice, lemon puree, lime puree, cranberry juice, orange juice, pineapple juice, apple juice, grapefruit juice, phosphoric acid or mixtures thereof. Any food grade acid known in the art may be utilized.

The acid inherently provided by the fruit juice will also effect the pH level of the finished product. As the relative level of fruit juice is increased, a corresponding decrease in the amount of food grade acid required to adjust the pH of the beverage is observed. It is also preferred for the beverages of this invention to contain high levels of Vitamin C (100% of the RDI). The presence of Vitamin C (ascorbic acid) will also serve to lower the pH of the beverage. The quantity of food grade acid utilized will vary with the relative concentration of fruit juice and Vitamin C in the beverage. Manipulating the concentration of food grade acid to obtain a pH in the range of from about 3.5 to about 4.5 is well known to those skilled in the art. For example, the orange, carrot, mango, pineapple juice soy product described in Example II did not require additional acid beyond the vitamin C and juices utilized in the formula. However, the Valencia orange soy product described in Example IV required supplemental lactic acid and citric acid to obtain the desired pH.

The beverages of the present invention will also desirably include a flavoring and or color to complement the natural juice flavor utilized in juice/soy beverage. The additional flavoring helps to cover or work with the beany/nutty/bitter notes apparent in soy protein. Useful flavorings include, for example, apple, apricot, banana, blackberry, blueberry, boysenberry, melon, cherry, cranberry, current, elderberry, grape, grapefruit, honey dew, kiwi, lemon, lime, mango, nectarine, orange papaya, passion fruit, peach, pineapple, plum, pomegranate, plum, raspberry, strawberry, tangerine, watermelon, tomato, carrot, celery, parsley, watercress, cabbage, broccoli, beet, cucumber, and bell pepper.

Natural flavors are materials which are comprised of flavor compounds derived from natural bases (typically botanicals such as herbs, spices, fruits or compounds derived from fermentation), a non-synthetic carrier (ethanol, propylene glycol, etc.), and agents which help preserve the natural flavors (grain ethanol, non-synthetic glycerin, non-synthetic acetic acid) The natural constituents included in the natural flavor are extracted using a number of natural and synthetic solvents. The solvents are removed by evaporation with the final flavor compounds including trace amounts of the solvents (typically<10 ppm). The number of flavor compounds comprising natural flavors vary, but may number up to 100 or more. A natural or organic version of the beverages of this invention incorporates natural flavors.

The beverages of this invention can be manufactured using techniques well known to those skilled in the art. While manufacturing variations are certainly well known to those skilled in the beverage arts, a few of the manufacturing techniques are described in detail in the Examples. Generally speaking, two slurries (carbohydrate and protein) are prepared separately by mixing the carbohydrate and minerals together and the protein in water. The two slurries are then mixed together. An optional oil blend is prepared containing all oils, any emulsifier, and the fat soluble vitamins which is added to the carbohydrate and protein blend. The resulting mixture is homogenized, heat processed, standardized with water soluble vitamins, flavored and the liquid sterilized. The formula can be sterilized and subsequently utilized on a ready-to-feed (RTF) basis or stored in a concentrated liquid.

A second embodiment of the invention is a method for providing soy protein containing inherent isoflavones to an individual by feeding the individual the beverage described above.

A third embodiment of the invention is a method for providing phytochemicals to an individual by feeding the individual the beverage described above.

EXAMPLE I

Table 3 presents a bill of materials for manufacturing 6.8 kg of a orange and carrot juice/soy beverage according to the present invention. A detailed description of its manufacture follows.

TABLE 3

Bill of Materials For Orange and Carrot Juice Soy Product

| Ingredient Name | Amount |
|---|---|
| Water | 5.2 kg |
| Soy Protein | 332 gm |
| Orange Juice (65 Brix) | 309 gm |
| Carrot Juice (70 Brix) | 194.4 gm |
| Pectin | 18 gm |
| Cane Juice Solids | 488 gm |
| Canola Oil | 3.35 gm |
| Ascorbic Acid | 2.22 gm |
| Vitamin DEK premix^ | 0.66 gm |
| WSV Premix* | 0.44 gm |
| Vitamin A Palmitate | 0.07 gm |

^per gm of Vitamin DEK premix: 5815 IU vitamin $D_3$, 671 IU vitamin E, 1.12 IU vitamin $K_1$.

TABLE 3-continued

Bill of Materials For Orange and Carrot Juice Soy Product

| Ingredient Name | Amount |
|---|---|

*per gm of WSV premix: 375 mg niacinamide, 242 mg calcium pantothenate, 8.4 mg folic acid, 62 mg thiamine chloride, 48 mg riboflavin, 59 mg pyridoxine hydrochloride, 165 mcg cyanocobalamin, and 7305 mcg biotin The beverages of the present invention are manufactured by preparing three slurries which are blended together, heat treated, standardized, and aseptically packaged. The process for manufacturing 6.8 kg of a beverage, using the bill of materials from Table 3, is described in detail below.

A carbohydrate/mineral slurry is prepared by combining the specified amount of pectin with the required amount of water under high agitation. The mixture is heated to a temperature of from about 140° F. to about 150° F. with agitation. The slurry is held under agitation for a minimum of 5 minutes. The cane juice solids is added under high agitation and allowed to dissolve. The completed carbohydrate/mineral slurry is held under high agitation at a temperature from about 140° F. to about 150° F. for not longer than twelve hours until it is blended with the other slurries.

An oil blend is prepared by combining and heating the canola oil to a temperature from about 130° F. to about 140° F. with agitation. The Vitamin D,E,K premix (distributed by Vitamin, Inc., Chicago, Ill.) and Vitamin A Palmitate are then added to the slurry with agitation. The completed oil slurry is held under moderate agitation at a temperature from about 130° F. to about 140° F. for a period of no longer than twelve hours until it is blended with the other slurries.

A 10 to 12% protein-in-water slurry is prepared by first adding the soy protein (Soy protein distributed by Protein Technologies International, St. Louis, Mo.) to the required amount of water under high agitation. The slurry is heated to a temperature from about 85° F. to about 95° F. with agitation and held for a minimum of 15 minutes. The required amount of orange juice concentrate and carrot juice is added under agitation. The completed protein-in-water slurry is held under moderate agitation at a temperature from about 145° F. to about 155° F. for a period of no longer than two hours until it is blended with the other slurries.

The protein-in-water and oil slurries are blended together with agitation and the resultant blend is maintained at a temperature from about 140° F. to about 150° F. After waiting for at least five minutes, the carbohydrate slurry is added to the blend from the preceding step with agitation and the resultant blend is maintained at a temperature from about 140° F. to about 150° F.

After waiting for a period of not less than five minutes nor greater than two hours, the blend is deaerated at 10–15 in. Hg, preheated through a plate/coil heat exchanger to 155–165° F., emulsified at 900–1100 psig, passed through a plate/coil heater and heated to from about 250° F. to about 255° F., heated to a temperature of about 298° F. to about 302° F. with a hold time of about 5 seconds, temperature reduced to from about 250° F. to about 255° F. by passing through a flash cooler, temperature reduced to from about 160° F. to about 170° F. by passing through a plate/coil heat exchanger, homogenized at about 3900 to about 4100/about 400 to about 600 psig, passed through a hold tube for at least 16 seconds at temperature from about 165° F. to about 175° F., cooled to a temperature from about 34° F. to about 45° F. by passing through a heat exchanger, and stored at a temperature from about 34° F. to about 45° F. with agitation.

After the above steps have been completed, appropriate analytical testing for quality control is conducted. Based on the analytical results of the quality control tests, an appropriate amount of water is added to the batch with agitation for dilution to the preferred total solids.

A vitamin solution is prepared separately and added to the processed blend.

The vitamin solution is prepared by adding the following ingredients to the required amount of water, under agitation: Ascorbic Acid and Water Soluble Vitamin Premix (distributed by Fortitech, Inc., Schenectady, N.Y.). The vitamin solution pH is adjusted to from about 6 to about 10 with 45% KOH. The vitamin slurry is then added to the blended slurry under agitation.

The final blend pH is adjusted to 4.0 with 10% malice and 10% citric acid solutions. The completed product is then aseptically filled in to suitable containers.

EXAMPLE II

The orange, carrot, mango, pineapple soy beverage was made as described in Example I using the bill of materials from Table 4.

TABLE 4

Bill of Materials For Orange, Carrot, Mango, Pineapple Juice Soy Product

| Ingredient Name | Amount |
|---|---|
| Water | 4.7 kg |
| Soy Protein | 333 gm |
| Orange Juice (65 Brix) | 62 gm |
| Carrot Juice (70 Brix) | 194.4 gm |
| mango | 702 gm |
| Pineapple | 141.4 gm |
| Pectin | 18 gm |
| Cane Juice Solids | 472 gm |
| Canola Oil | 3.35 gm |
| Ascorbic Acid | 2.22 gm |
| Vitamin DEK premix^ | 0.66 gm |
| WSV Premix* | 0.44 gm |
| Vitamin A Palmitate | 0.07 gm |

^per gm of Vitamin DEK premix: 5815 IU vitamin $D_3$, 671 IU vitamin E, 1.12 IU vitamin $K_1$.
*per gm of WSV premix: 375 mg niacinamide, 242 mg calcium pantothenate, 8.4 mg folic acid, 62 mg thiamine chloride, 48 mg riboflavin, 59 mg pyridoxine hydrochloride, 165 mcg cyanocobalamin, and 7305 mcg biotin The required amount of the orange, mango and pineapple were added to the protein in water slurry. The carrot juice was added to the carbohydrate slurry.

EXAMPLE III

The orange, carrot, strawberry banana soy beverage was made as described in Example I using the bill of materials from Table 5.

TABLE 5

Bill of Materials For Orange, Carrot juice and Strawberry, Banana Puree Soy Product

| Ingredient Name | Amount |
|---|---|
| Water | 5.2 kg |
| Soy Protein | 332 gm |
| Orange Juice (65 Brix) | 112 gm |
| Carrot Juice (70 Brix) | 194.4 gm |
| Strawberry Puree | 272.2 gm |

TABLE 5-continued

Bill of Materials For Orange, Carrot juice and Strawberry, Banana Puree Soy Product

| Ingredient Name | Amount |
| --- | --- |
| Banana Puree | 69.6 gm |
| Pectin | 18 gm |
| Cane Juice Solids | 574 gm |
| Canola Oil | 3.35 gm |
| Ascorbic Acid | 2.22 gm |
| Vitamin DEK premix^ | 0.66 gm |
| WSV Premix* | 0.44 gm |
| Vitamin A Palmitate | 0.07 gm |

^per gm of Vitamin DEK premix: 5815 IU vitamin $D_3$, 671 IU vitamin E, 1.12 IU vitamin $K_1$.
*per gm of WSV premix: 375 mg niacinamide, 242 mg calcium pantothenate, 8.4 mg folic acid, 62 mg thiamine chloride, 48 mg riboflavin, 59 mg pyridoxine hydrochloride, 165 mcg cyanocobalamin, and 7305 mcg biotin The required amounts of the orange juice, strawberry and banana puree (Chiquita Deseeded Acidified Banana Puree distributed by Chiquita Brands, Inc of Cincinnati, Ohio) were added to the protein in water slurry. The carrot juice was added to the carbohydrate slurry.

EXAMPLE IV

The soy beverage of the present invention may also be manufactured without the oil blend. The process for manufacturing 5 kg of the soy beverage, using the bill of materials from Table 6, is described in detail below.

TABLE 6

Bill of Materials For Valencia Orange Soy Beverage

| Ingredient Name | Amount |
| --- | --- |
| Water | 3.85 kg |
| Soy Protein | 219 gm |
| Orange Juice Concentrate (60 Brix) | 246 gm |
| Pectin | 13 gm |
| Sucrose | 600 gm |
| Lactic Acid (88%) | 35 gm |
| Citric Acid | 15 gm |
| Valencia Orange Flavor | 9 gm |
| Masking Flavor | 5 gm |
| Beta carotene | 4 gm |
| Ascorbic Acid | 1.64 gm |
| Vitamin DEK premix^ | 0.49 gm |
| WSV Premix* | 0.32 gm |
| Vitamin A Palmitate | 0.05 gm |

^per gm of Vitamin DEK premix: 5815 IU vitamin $D_3$, 671 IU vitamin E, 1.12 IU vitamin $K_1$.
*per gm of WSV premix: 375 mg niacinamide, 242 mg calcium pantothenate, 8.4 mg folic acid, 62 mg thiamine chloride, 48 mg riboflavin, 59 mg pyridoxine hydrochloride, 165 mcg cyanocobalamin, and 7305 mcg biotin A protein-in-water slurry is prepared by first adding the soy protein to the required amount of water under high agitation. The slurry was heated to a temperature of 150° F. with agitation and held for a minimum of 10 minutes. The protein slurry was then cooled to 120° F. and held until blended with the pectin slurry.

A pectin slurry was prepared by combining the specified amount of pectin with the required amount of water under high agitation. The mixture was heated to a temperature of 150° F. with agitation and held for a minimum of 10 minutes. The slurry-was then cooled to 120° F. and held until blended with the protein in water slurry.

The protein-in-water and pectin slurries were blended together with agitation. The required amounts of the remaining ingredients were then added. The blend was heated to 206.5° F. with a 48 second hold, homogenized at 4000/500 psi and filled at 195–200° F. into glass or plastic bottles. The filled containers were inverted for 3 minutes and cooled in an ice water bath.

The orange juice concentrate was sourced from Vita-Pakt Citrus Products Co. of Covina, Calif. The Valencia orange flavor was sourced from Ottens Flavors of Philadelphia, Pa. The masking flavor was sourced from Robertet Flavors Inc. of South Plainfield, N.J.

EXAMPLE V

The raspberry lemonade soy beverage was made as described in Example IV using the bill of materials from Table 7.

TABLE 7

Bill of Materials For Raspberry Lemonade Soy Beverage

| Ingredient Name | Amount |
| --- | --- |
| Water | 3.86 kg |
| Soy Protein | 219 gm |
| Raspberry Juice Concentrate (60 Brix) | 153.5 gm |
| Lemon Puree (14.8 Brix) | 76 gm |
| Pectin | 13 gm |
| Sucrose | 600 gm |
| Lactic Acid (88%) | 47.5 gm |
| Raspberry Essence | 5.85 gm |
| Lemonade Flavor | 12.5 gm |
| masking Flavor | 5 gm |
| Cochineal Extract | 3 gm |
| Ascorbic Acid | 1.64 gm |
| Vitamin DEK premix^ | 0.49 gm |
| WSV Premix* | 0.32 gm |
| Vitamin A Palmitate | 0.05 gm |

^per gm of Vitamin DEK premix: 5815 IU vitamin $D_3$, 671 IU vitamin E, 1.12 IU vitamin $K_1$.
*per gm of WSV premix: 375 mg niacinamide, 242 mg calcium pantothenate, 8.4 mg folic acid, 62 mg thiamine chloride, 48 mg riboflavin, 59 mg pyridoxine hydrochloride, 165 mcg cyanocobalamin, and 7305 mcg biotin The raspberry juice concentrate and raspberry essence was sourced from J.M. Smucker Company of Orrville, Ohio. The lemon puree was sourced from Vita-Pakt Citrus Products Co. of Covina, Calif. The lemonade flavor was sourced from Mission. The masking flavor was sourced from Robertet Flavors Inc. of South Plainfield, N.J. The cochineal extract was sourced from Chr. Hansen of Milwaukee, Wis.

EXAMPLE VI

The cranberry raspberry soy beverage was made as described in Example IV using the bill of materials from Table 8.

TABLE 8

Bill of Materials For Cranberry Raspberry Soy Beverage

| Ingredient Name | Amount |
| --- | --- |
| Water | 4 kg |
| Soy Protein | 219 gm |
| Cranberry Juice Concentrate (50 Brix) | 127.5 gm |
| Raspberry Juice Concentrate (60 Brix) | 61.5 gm |
| Pectin | 13 gm |
| Sucrose | 500 gm |
| Lactic Acid (88%) | 35 gm |
| Cranberry Essence | 4.6 gm |
| Raspberry Essence | 2.35 gm |

TABLE 8-continued

Bill of Materials For Cranberry Raspberry Soy Beverage

| Ingredient Name | Amount |
| --- | --- |
| masking Flavor | 5 gm |
| Cranberry Flavor | 12.5 gm |
| Raspberry Flavor | 10 gm |
| Ascorbic Acid | 1.64 gm |
| Vitamin DEK premix^ | 0.49 gm |
| WSV Premix* | 0.32 gm |
| Vitamin A Palmitate | 0.05 gm |

^per gm of Vitamin DEK premix: 5815 IU vitamin $D_3$, 671 IU vitamin E, 1.12 IU vitamin $K_1$.
*per gm of WSV premix: 375 mg niacinamide, 242 mg calcium pantothenate, 8.4 mg folic acid, 62 mg thiamine chloride, 48 mg riboflavin, 59 mg pyridoxine hydrochloride, 165 mcg cyanocobalamin, and 7305 mcg biotin The raspberry juice concentrate, cranberry juice concentrate, cranberry essence and raspberry essence were sourced from J. M. Smucker Company of Orrville, Ohio. The masking flavor was sourced from Robertet Flavors Inc. of South Plainfield, N.J. The cranberry flavor was sourced from Haarmann & Reimer of Springfield, N.J. The raspberry flavor was sourced from Metarom.

EXAMPLE VII

The boysenberry soy beverage was made as described in Example IV using the bill of materials from Table 9.

TABLE 9

Bill of Materials For Boysenberry Soy Beverage

| Ingredient Name | Amount |
| --- | --- |
| Water | 4 kg |
| Soy Protein | 219 gm |
| Boysenberry Juice Concentrate (60 Brix) | 208 gm |
| Pectin | 13.2 gm |
| Sucrose | 500 gm |
| Lactic Acid (88%) | 50 gm |
| Boysenberry Essence | 8.85 gm |
| Boysenberry Flavor | 7.5 gm |
| Masking Flavor | 5 gm |
| Ascorbic Acid | 1.64 gm |
| Vitamin DEK premix^ | 0.49 gm |
| WSV Premix* | 0.32 gm |
| Vitamin A Palmitate | 0.05 gm |

^per gm of Vitamin DEK premix: 5815 IU vitamin $D_3$, 671 IU vitamin E, 1.21 IU vitamin $K_1$.
*per gm of WSV premix: 375 mg niacinamide, 242 mg calcium pantothenate, 8.4 mg folic acid, 62 mg thiamine chloride, 48 mg riboflavin, 59 mg pyridoxine hydrochloride, 165 mcg cyanocobalamin, and 7305 mcg biotin The boysenberry juice concentrate and boysenberry essence were sourced from J. M. Smucker Company of Orrville, Ohio. The boysenberry flavor was sourced from Haarmann & Reimer of Springfield, N.J. The masking flavor was sourced from Robertet Flavors Inc. of South Plainfield, N.J.

The embodiments of the present invention may, of course, be carried out in other ways than those set forth herein without departing from the spirit and scope of the invention. The present embodiments are, therefore, to be considered in all respects as illustrative.

We claim:

1. A juice and soy protein beverage comprising:
   (a) a protein source supplying from about 10% to about 30% of the total calories of the product, wherein said protein source comprises at least one source of soy protein; and
   (b) a source of carbohydrate supplying from about 70% to about 90% of the total calories of the product, wherein said carbohydrate source comprises at least 10% by total weight juice selected from the group consisting of fruit juice and vegetable juice, and wherein the beverage has a °Brix:acid ratio of from about 10 to about 40.

2. The juice and soy protein beverage according to claim 1 wherein the soy protein contributes from about 30 to about 100 wt/wt % of the protein system.

3. The juice and soy protein beverage according to claim 1 wherein the juice supplies from about 10 to about 90 wt/wt % of the product.

4. The juice and soy protein beverage according to claim 1 wherein the protein source is selected from the group consisting of soy flakes, soy protein isolate, soy protein concentrate, hydrolyzed soy protein, soy flour, soy protein fiber, soy whey and mixtures thereof.

5. The juice and soy protein beverage according to claim 4 in which the soy protein source comprises at least about 0.5 mg isoflavones/gm soy protein.

6. A method for providing isoflavones to an individual comprising enterally feeding said individual the juice and soy protein beverage according to claim 5.

7. The juice and soy protein beverage according to claim 4 wherein the soy protein has a DH less than 15%.

8. The juice and soy protein beverage according to claim 1 which further comprises a lipid source selected from the group consisting of high oleic safflower oil, soy oil, fractionated coconut oil, high oleic sunflower oil, corn oil, canola oil and mixtures thereof.

9. The juice and soy protein beverage according to claim 8 in which the lipid source comprises canola oil.

10. The juice and soy protein beverage according to claim 8 wherein the lipid source supplies less than about 6% of the total calories of the product.

11. The juice and soy protein beverage according to claim 1 wherein the carbohydrate source supplies from about 75% to about 87% of the total calories of the product.

12. The juice and soy protein beverage according to claim 1 wherein the carbohydrate source is selected from the group consisting of hydrolyzed corn starch, maltodextrin, glucose polymers, sucrose, corn syrup solids, glucose, fructose, lactose, high fructose corn syrup, fructooligosaccharides, honey, cane juice solids, fruit juice, vegetable juice, fruit puree, vegetable puree and mixtures thereof.

13. The juice and soy protein beverage according to claim 1 which further comprises a vitamin system, said vitamin system provides at least 10% of the RDI for one or more vitamins selected from the group consisting of Vitamin A, Vitamin $B_1$, Vitamin $B_2$, Vitamin $B_6$, Vitamin $B_{12}$, Vitamin C, Vitamin D, Vitamin E, Vitamin K, Biotin, Folic Acid, Pantothenic Acid, Niacin in a single serving.

14. The juice and soy protein beverage according to claim 1 which further comprises a caloric density from about 0.4 kcal/ml to about 1.0 kcal/ml.

15. The juice and soy protein beverage according to claim 1 which further comprises a viscosity of from about 10 to about 250 cps.

16. The juice and soy protein beverage according to claim 1 which further comprises a pH of from about 2 to about 7.

17. The juice and soy protein beverage according to claim 1 which further comprises a stabilizer system, said stabilizer system comprises less than about 1 wt./wt. % low methoxy pectin.

18. A method for providing soy protein to an individual comprising enterally feeding said individual the juice and soy protein beverage according to claim 1.

19. A method for providing phytochemicals to an individual comprising enterally feeding said individual the juice and soy protein beverage according to claim 1.

20. A juice and soy protein beverage which comprises:
(a) a protein system providing from about 13% to about 25% of the total calories of the product, wherein said source of soy protein
provides about 30% to 100% of said protein system;
(b) a carbohydrate system comprises juice from 10 wt/wt % to 90 wt/wt %;
(c) a caloric density from about 0.4 kcal/ml to about 0.7 kcal/ml; and
(d) a stabilizer system, said stabilizer system comprises low methoxy pectin; wherein the beverage has a °Brix-:acid ratio of from about 10 to about 40.

21. The juice and soy protein beverage according to claim 20 wherein the soy protein has a DH less than 15%.

22. The juice and soy protein beverage according to claim 20 in which the soy protein comprises at least 0.5 mg isoflavones/gm soy protein.

23. The juice and soy protein beverage of claim 20 which further comprises a vitamin and mineral system, said vitamin and mineral system provides at least 10% of the RDI for one or more vitamins and minerals selected from the group consisting of Vitamin A, beta-carotene, Vitamin $B_1$, Vitamin $B_2$, Vitamin $B_6$, Vitamin $B_{12}$, Vitamin C, Vitamin D, Vitamin E, Vitamin K, Biotin, Folic Acid, Pantothenic Acid, Niacin, Choline, calcium, potassium, sodium, phosphorous, magnesium, chloride, trace minerals, and ultra trace minerals.

24. The juice and soy protein beverage according to claim 20 which further comprises a viscosity of from about 10 to about 35 cps.

25. The juice and soy protein beverage according to claim 20 wherein said low methoxy pectin comprises from about 0.2 to about 0.3 wt/wt % of the beverage.

26. A method for providing soy protein to an individual comprising enterally feeding said individual the juice and soy protein beverage according to claim 20.

27. A method for providing isoflavones to an individual comprising enterally feeding said individual the juice and soy protein beverage according to claim 20.

* * * * *